United States Patent [19]

Malloy, deceased et al.

[11] Patent Number: 4,734,873

[45] Date of Patent: Mar. 29, 1988

[54] METHOD OF DIGITAL PROCESS VARIABLE TRANSMITTER CALIBRATION AND A PROCESS VARIABLE TRANSMITTER SYSTEM UTILIZING THE SAME

[75] Inventors: John R. Malloy, deceased, late of Drexel Hill, by Virginia M. Malloy, executrix; Arthur M. Olsen, Pennsburg, both of Pa.

[73] Assignee: Honeywell Inc., Minneapolis, Minn.

[21] Appl. No.: 886,999

[22] Filed: Jul. 18, 1986

Related U.S. Application Data

[63] Continuation of Ser. No. 576,494, Feb. 2, 1984, abandoned.

[51] Int. Cl.[4] .................... G01C 25/00; G01C 17/38; G01R 1/02
[52] U.S. Cl. .................... 364/571; 324/130; 73/1 R
[58] Field of Search .............. 364/178, 179, 571, 573; 73/1 R, 4 R; 324/130

[56] References Cited

U.S. PATENT DOCUMENTS

| Re. 31,222 | 4/1983 | McCracken | 364/5 B X |
|---|---|---|---|
| 4,149,254 | 4/1979 | Molusis | 364/510 |
| 4,161,782 | 7/1979 | McCracken | 364/573 X |
| 4,192,005 | 3/1980 | Kurtz | 364/571 |
| 4,326,411 | 4/1982 | Gant et al. | 364/510 X |
| 4,390,956 | 6/1983 | Cornforth et al. | 364/571 X |
| 4,403,296 | 9/1983 | Prosky | 364/573 |
| 4,437,164 | 3/1984 | Branch, III | 364/571 |
| 4,446,715 | 5/1984 | Bailey | 364/571 X |
| 4,481,596 | 11/1984 | Townzen | 364/571 |

FOREIGN PATENT DOCUMENTS 0097479  1/1984  United Kingdom ................ 364/571

Primary Examiner—Errol A. Krass
Assistant Examiner—Joseph L. Dixon
Attorney, Agent, or Firm—Mitchell J. Halista; Albin Medved

[57] ABSTRACT

A method of digital process variable transmitter calibration includes the steps of sensing the process variable (PV) to produce an analog output which is converted to a digital signal representation. The digital signal is corrected by a microprocessor using a characterization equation previously individually developed during a manufacturing testing of the process variable transmitter over a predetermined range of environmental stimuli to ascrtain the coefficients for a polynomial in the form of $PV = A_o = A_1 P + A_2 + \ldots A_i P^i$. Thus, the digital computer produces a process variable representation as a modified digital output. Subsequently, the digital output from the computer is converted to a conventional 4-20 mA analog signal for use as a process control signal. The process variable transmitter apparatus utilizing the aforesaid method includes means for receiving an output from a process variable sensor, an analog-to-digital converter for converting the received output from the sensor to a digital representation, a digital computer, a non-volatile memory for storing an individualized correction equation determined during the manufacturing testing of the transmitter and a digital-to-analog converter for converting the computer output to an analog control signal.

13 Claims, 1 Drawing Figure

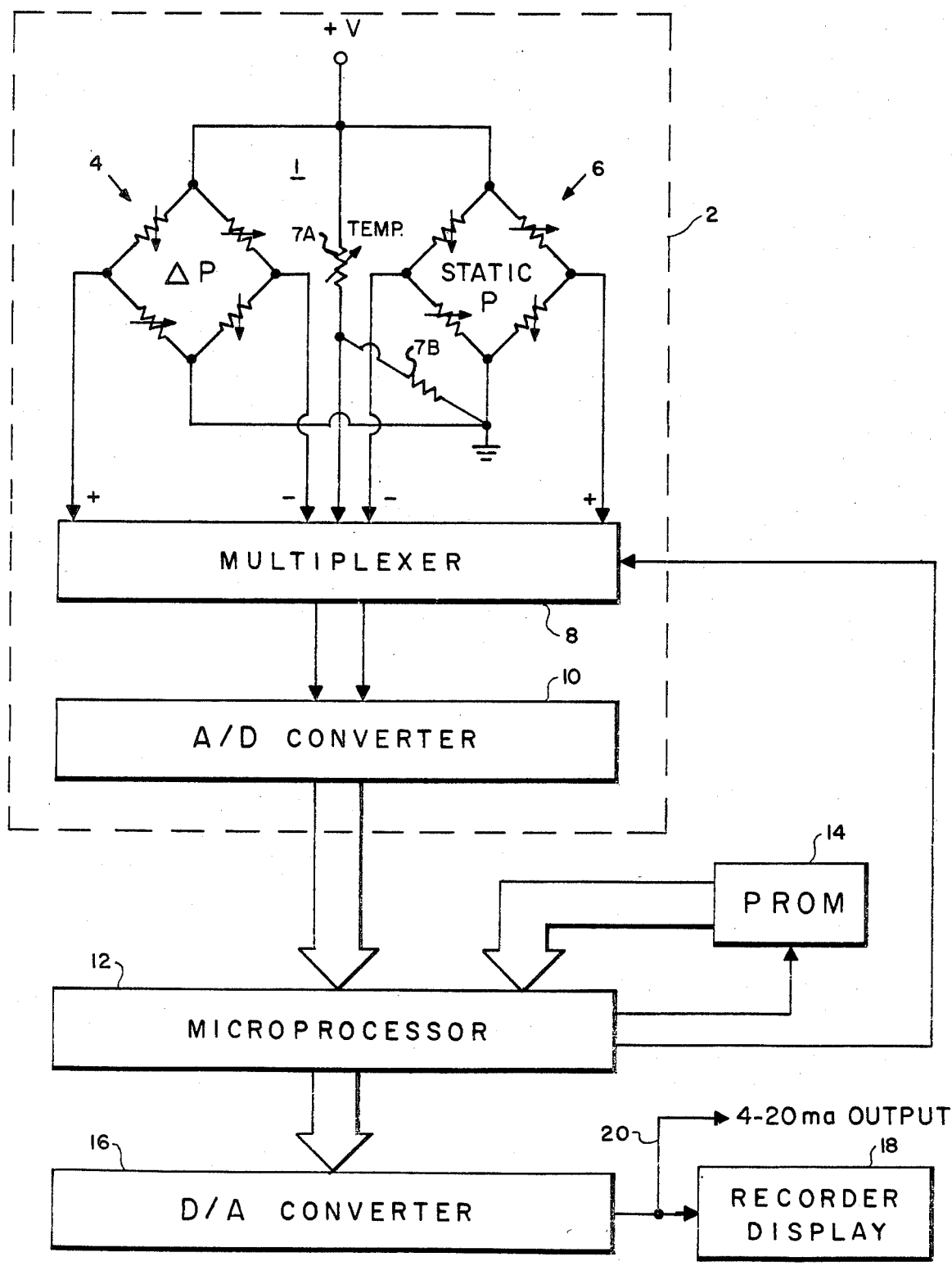

METHOD OF DIGITAL PROCESS VARIABLE TRANSMITTER CALIBRATION AND A PROCESS VARIABLE TRANSMITTER SYSTEM UTILIZING THE SAME

This application is a continuation of application Ser. No. 576,494, filed 2/2/84, now abandoned.

BACKGROUND OF THE INVENTION

Field of the Invention

This invention related to a method and apparatus for digital data handling. More specifically, the present invention is directed to a method and apparatus for digital data handling of a process variable transmitter to provide a digital correction of the transmitter output.

SUMMARY OF THE INVENTION

An object of the present invention is to provide an improved method and apparatus for digital data handling to provide a digital correction of a process variable transmitter output.

In accomplishing this and other objects, there has been provided, in accordance with the present invention, a method for digital correction of a process variable transmitter output including the steps of sensing the process variable, converting the process variable analog signal into a digital representation and supplying the digital representation to a digital computer to be used in computing a digital output in accordance with a characterization equation which is a function of the operation of the process variable transmitter. A system utilizing the method uses an analog-to-digital converter means for converting an analog signal from a sensor representative of a process variable into a digital equivalent, a non-volatile memory for storing a transmitter characterization equation, a digital computer means connected to the converter means and the memory for computing a digital output representative of the digital equivalent from the analog-to-digital converter means in accordance with the characterization equation and a digital-to-analog converter for converting the digital output from the computer into an analog process control signal.

BRIEF DESCRIPTION OF THE DRAWING

A better understanding of the present invention may better be had when the following description is read in connection with the accompanying drawing, in which the single FIGURE is a block diagram of a digital data handling apparatus embodying an example of the present invention.

DESCRIPTION OF THE PREFERRED EMBODIMENT

Referring to the single FIGURE drawing in more detail, there is shown a process variable sensor in the form of a pressure transmitter 1. The pressure transmitter 1 may include a housing 2 for providing an enclosure for a pair of differential and static pressure sensing bridge circuits 4 and 6 respectively. The housing 2 would, of course, be arranged to be connected to a source of pressure to be measured to enable the pressure to affect the bridge circuits 4 and 6 in a manner well-known in the art. The bridge circuits 4 and 6 may advantageously be formed as piezo-resistive elements on a silicon surface in a manner well-known in the art. A temperature sensitive element including a temperature sensitive portion 7A connected in series with a fixed resistance portion 7B is also included in the transmitter 1 to produce an output signal which is affected primarily by the environmental temperature of the transmitter 1. The bridge circuits 4 and 6 and the temperature sensitive elements 7A, 7B are powered by a source of direct current voltage $+V$ while the output of each of the bridge circuits 4, 6 and the output of the temperature sensitive element 7A, 7B taken from the junction between the portions 7A, 7B are connected to corresponding inputs of a signal multiplexer 8. The output of the multiplexer 8 is applied to an analog-to-digital (A/D) converter 10. The digital output of the converter 10 representative of a converted output from the multiplexer 8 is conducted out of the housing 2 via a fluid-tight electrical feedthrough (not shown) and is applied to a microprocessor 12.

The microprocessor 12 is also connected in a conventional manner to interrogate a non-volatile memory, e.g., PROM 14, which is used to store a specific characterization equation individually developed for the pressure transmitter 1, as described more fully hereinafter, to be used for correcting, e.g., concurrently linearizing and compensating for static pressure and temperature, the output from the multiplexer 8. A digital output from the microprocessor 12 representative of the pressure sensed by the pressure transmitter 1 is applied to a digital-to-analog (D/A) converter 16. The output of the D/A converter 16 may be applied to a recorder or other display device 18 and is used as a conventional 4–20 mA output which is transmitted on an output line 20 to associated process control equipment (not shown).

MODE OF OPERATION

During a manufacturing testing of the process variable sensor, e.g., the pressure transmitter 1 using the pressure sensing bridges 4, 6, and the temperature sensor 7A, 7B a characterization equation, which describes the individual performance of the transmitter 1 as a polynomial equation, is stored in the memory 14. The individualized characterization equation for each transmitter 1 may be developed by a separate manufacturing testing computer using a conventional least squares curve fitting technique, i.e., to produce a curve to fit measured data, utilizing samples of the output from the converter 10 for a predetermined range of pressure and temperature inputs to the pressure bridges 4, 6 and the temperature sensors 7A, 7B. For example, a matrix of 264 data points is obtained from the differential pressure ($\Delta P$) sensing bridge 4, the static pressure (SP) sensing bridge 6 and the temperature sensors 7A, 7B to correspond to the full range of environmental conditions of differential pressure, static pressure and temperature to which the transmitter 1 would be subject during normal operation. A typical range of test points would include eight temperatures, eleven differential pressures (with one being zero) and three static pressure pressures (including zero static pressure). At each combination of test conditions, the outputs of the four sensors 4, 6, 7A, 7B are recorded to obtain 94 data points which are extrapolated to produce the 264 data point matrix.

In general, the process variable pressure (PV) is a function of the output of the differential pressure ($\Delta P$) measuring sensor 4 (P), the static pressure (SP) measuring sensor 6 (S) and the temperature (TEMP) mesuring sensors 7A, 7B (T), i.e., $PV = f(P,S,T)$. Additionally, using the aforesaid sensor element construction, it is also seen that:

P=f (PV, SP, TEMP)
S=f (PV, SP, TEMP)
T=f (PV, SP, TEMP)≅f (TEMP)

The generalized characterization equation is in a conventional polynomial form using standard notation for superscripts as powers and subscripts as identifiers of $PV = A_o + A_1P + A_2P^2 \ldots + A_iP^i$ where $A_i = f(S,T)$, where $$A_i = S^0[a_{0i} + a_{1i}T + a_{2i}T^2 + \ldots + a_{ni}T^n] +$$
$$S^1[b_{0i} + b_{1i}T + b_{2i}T^2 + \ldots + b_{ni}T^n] + \ldots +$$
$$S^m[w_{0i} + w_{1i}T + w_{2i}T^2 + \ldots + w_{ni}T^n]$$

and as a practical limit $i \leq 5$, $n \leq 7$, $m \leq 2$. This produces a theoretical universe of $(i+1)(n+1)(m+1) = 144$ terms. The polynomial for a specific transmitter is made up of a unique subset of the universe of terms. Summarizing the foregoing, it may be seen that the coefficients (a,b, . . . ,w) are the output of the previously mentioned curve fitting procedure. The inputs to the curve fitting procedure are the 264 values of P, S and T and the corresponding value of differential pressure (P). The curve fitting procedure calculates the coefficients which are numbers which describe the relationship between the outputs of the P, S, and T sensors, 4, 6, 7A, 7B and the actual value of the process variable (PV) which in this case is differential pressure (P). The numeric values of the coefficients are obviously different for every sensor and, therefore, a specific numeric example cannot be listed. In a simple linear equation such as $y = mx + b$, the coefficients m and b correspond to the slope and intercept of the line respectively. In a multivariable equation such as the above characterization equation the description of the coefficients is more complicated. For each $A_i$, the $a_{oi}$ is the intercept of the temperature effect on the intercept of the static pressure effect of $A_i$. The coefficient $a_{1i}$ is the slope of the temperature effect on the intercept of the static pressure effect on $A_i$. The coefficients $a_{2i}$ through $a_{ni}$ represent the higher power effects of temperature on the intercept of the static pressure effect on $A_i$. The coefficient $b_{oi}$ is the intercept of the temperature effect on the slope of the static pressure effect on $A_i$. The coefficient $b_{1i}$ is the slope of the temperature effect on the slope of the static pressure effect on $A_i$. The coefficients $b_{2i}$ through $b_{ni}$ represent the higher power effects of temperature on the slope of the static pressure effect on $A_i$. Similarly, the generlized coefficients $w_{oi}$ through $w_{ni}$ represent the intercept, slope and higher power effects of temperature on the higher power effects of static pressure on $A_i$. The data identifying which terms comprise the polynomial for a specific transmitter along with the corresponding unique coefficients are stored in the PROM 14 to be used to solve for PV each set of readings from the sensors 4, 6, 7A, 7B during the use of the transmitter as a pressure transmitter. Thus, the resulting characterization equation can then be used by the microprocessor 12 to modify the digital word outputs from the converter 10 representative of the sensor outputs to provide a corrected digital output. The digital output of the microprocessor 12 provides a digital word representation of the sensed pressure to the D/A converter 16 for conversion to an analog output signal e.g., a 4–20 mA signal.

As discussed above, the characterization equation is unique to each pressure transmitter and is stored in the memory 14 at the time of manufacture of the transmitter 1. The use of such individualized data provides a means for effecting a non-linearity correction of the sensed pressure data. Further, the stored correction data is insensitive to the environmental conditions that produce the need for such a correction operation. The use of such a characterization equation provides a significant improvement in the accuracy of the pressure measurement by an order of magnitude. Concurrently, the gain in precision and stability of the non-linearity correction allows a "turndown" ratio as great as 400 to 1 for the pressure transmitter whereby the transmitter that is rated for a certain pressure span can be used at a much smaller pressure span anywhere in the maximum span range, e.g., the transmitter can be turned down from a 400 inches of $H_2O$ to 1 inch of $H_2O$. This enables the transmitter to cover a much wider differential pressure range to reduce the number of transmitters needed to cover a total differential pressure range. Thus, the reduction in the number of different transmitter models that would have to be either manufactured or stored as spare parts would result in a substantial saving over conventional pressure transmitters.

Modifications of the physical arrangement of the elements shown in the single FIGURE illustration may be used in a particular application of the invention without departing from the scope of the invention. For example, the microprocessor 12, the PROM 14 and the D/A converter 16 may be included in the housing 2 with only the output line 20 penetrating the housing 2 to provide contact with the associated process control and/or display equipment. Further, the apparatus within the housing 2 may be powered by a source of direct current which may be supplied over the same output line 20 on which the 4–20 mA output signal is transmitted. Such a powering of the circuit within the husing 2 by the power obtained from the same electrical wires used to carry the output signal is well-known in the art.

Accordingly, it may be seen that there has been provided, in accordance with the present invention an improved method and apparatus for a digital calibration of a process variable sensor.

The embodiments of the invention in which an exclusive property or privilege is claimed are defined as follows:

1. A method for digital calibration of a process variable sensor comprising the steps of
   storing a characterization equation in the form of $PV = A_0A_1P + A_2P^2 + \ldots + A_iP^i$ where $A_i = f(S,T)$ and PV is the process variable, P is the output of a process variable differential value measuring sensor, S is the output of a process variable static value measuring sensor and T is the output of a sensor measuring an environmental temperature affecting the outputs of the process variable measuring sensors and where $$A_i = S^0[a_{0i} + a_{1i}T + a_{2i}T^2 + \ldots + a_{ni}T^n] +$$
$$S^1[b_{0i} + b_{1i}T + b_{2i}T^2 + \ldots + b_{ni}T^n] + \ldots +$$
$$S^m[w_{0i} + w_{1i}T + w_{2i}T^2 + \ldots + w_{ni}T^n]$$

measuring a process variable by the process variable sensor to produce an analog output signal representative of the process variable, converting the output from the process variable sensor to a digital representation thereof and supplying the digital representation to a digital computer to be used in computing a digital output in accordance with the stored characterization equation to produce a corrected version of the output of the process variable sensor independent of the effects of the environmental conditions.

2. A method as set forth in claim 1 which includes the further step of converting the digital output from the digital computer into an analog control signal.

3. A method as set forth in claim 2 wherein the analog control signal is a 4–20 mA signal.

4. A method as set forth in claim 1 wherein $i \leq 5$, $n \leq 7$ and $m \leq 2$.

5. A method as set forth in claim 1 wherein $i \leq 5$.

6. A method as set forth in claim 1 wherein the process variable is pressure (PP) and the environmental conditions are differential pressure (P) and static pressure (S) whereby $PP = f(P,S,T)$ as the basis of the characterization equation.

7. A process variable transmitter apparatus comprising analog-to-digital converter means for converting an analog output from a process variable sensor into a digital representation thereof, a non-volatile memory means for storing a transmitter characterization equation in the form of $PV = A_0 A_1 P + A_2 P^2 + \ldots + A_i P^i$ where $A_i = f(S,T)$ and PV is the process variable, P is the output of a process variable differential value measuring sensor, S is the output of a process variable static value measuring sensor and T is the output of a sensor measuring an environmental temperature affecting the outputs of ther process variable measuring sensors and where $$A_i = S^0[a_{0i} + a_{1i}T + a_{2i}T^2 + \ldots + a_{ni}T^n] + S^1[b_{0i} + b_{1i}T + b_{2i}T^2 + \ldots + b_{ni}T^n] + \ldots + S^m[w_{0i} + w_{2i}T + w_{2i}T^2 + \ldots + w_{ni}T^n], \text{ and}$$

a digital computer means connected to said converter means and said memory means for computing a digital output in accordance with the stored transmitter characterization equation to produce a corrected version of the digital representation from said converter means independent of the effects of the environment conditions.

8. A pressure transmitter as set forth in claim 7 and further including a digital-to-analog converter means for converting the digital output from said computer means into an analog signal.

9. A pressure transmitter as set forth in claim 8 wherein said analog signal is a 4–20 mA signal.

10. A pressure transmitter as set forth in claim 7 wherein
$i \leq 5$, $n \leq 7$ and $m \leq 2$.

11. A process variable transmitter as set forth in claim 7 where $i \leq 5$.

12. A transmitter as set forth in claim 7 wherein the process variable is pressure (PP) and the environmental conditions are differential pressure (P) and static pressure (S) whereby $PP = f(P,S,T)$ as the basis of the characterization equation.

13. A transmitter as set forth in claim 7 where $i < 5$.

* * * * *